UNITED STATES PATENT OFFICE.

ARNOLD HESS, OF HÖCHST-ON-THE-MAIN, GERMANY, ASSIGNOR TO FARB-WERKE, VORM. MEISTER LUCIUS & BRÜNING, OF SAME PLACE.

BLUE WOOL DYE AND PROCESS OF MAKING SAME.

SPECIFICATION forming part of Letters Patent No. 673,640, dated May 7, 1901.

Application filed February 27, 1901. Serial No. 49,126. (Specimens.)

*To all whom it may concern:*

Be it known that I, ARNOLD HESS, Ph. D., a citizen of the Empire of Germany, residing at Höchst-on-the-Main, in the Empire of Germany, have invented certain new and useful Improvements in the Manufacture of a Blue Dyestuff for Wool, of which the following is a specification.

I have found that a new blue dyestuff for wool may be obtained by introducing hydrogen sulfid into a solution of 1.5-dinitronaphthalene in chlorosulfonic acid.

I illustrate my process as follows: Ten parts, by weight, of 1.5-dinitronaphthalene are dissolved at ordinary temperature in eighty parts of chlorosulfonic acid. Hydrogen sulfid is then introduced with continued stirring. The solution, which is at first light brown, becomes darker. At 70° to 90° centigrade a vivid reaction sets in and the temperature rises to 130° to 140° centigrade. A higher temperature is avoided by cooling, and to complete the reaction the solution is finally heated for some hours to from 110° to 120° centigrade, while hydrogen sulfid is continuously introduced. The solution is poured on ice, filtered, and the product of reaction is purified by redissolving it in sodium carbonate.

When dry, the dyestuff is a black-blue powder of metallic luster readily soluble in hot water and in sodium carbonate with a blue-violet color and soluble in soda-lye with a blue and in concentrated sulfuric acid with a brown color. It is insoluble in nitrobenzene. It dyes wool blue in an acid-bath, and on subsequent treatment with chromates very fast gray shades are obtained.

Having now described my invention, what I claim is—

1. The herein-described process for the manufacture of a blue dyestuff for wool, which consists in introducing hydrogen sulfid into the solution of 1.5-dinitronaphthalene in chlorosulfonic acid, substantially as set forth.

2. As a new product, the blue dyestuff obtained by introducing hydrogen sulfid into a solution of 1.5-dinitronaphthalene in chlorosulfonic acid at temperatures of about 140° centigrade, being a black-blue powder of metallic luster, readily soluble in hot water and in sodium carbonate with a blue-violet color, in soda-lye with a blue and in concentrated sulfuric acid with a brown color, insoluble in nitrobenzene and dyeing wool blue in an acid-bath, yielding very fast gray shades on subsequent treatment with chromates.

In testimony that I claim the foregoing as my invention I have signed my name in presence of two subscribing witnesses.

ARNOLD HESS.

Witnesses:
ALFRED BRISBOIS,
BERNHARD LEYDECKER.